(12) United States Patent
Wheat et al.

(10) Patent No.: US 7,081,144 B2
(45) Date of Patent: Jul. 25, 2006

(54) AUTOTHERMAL REFORMING IN A FUEL PROCESSOR UTILIZING NON-PYROPHORIC SHIFT CATALYST

(75) Inventors: W. Spencer Wheat, Missouri City, TX (US); Vesna R. Mirkovic, Pearland, TX (US); Kevin H. Nguyen, Missouri City, TX (US); Curtis L. Krause, Houston, TX (US); James F. Stevens, Katy, TX (US); Daniel G. Casey, Kingwood, TX (US)

(73) Assignee: Texaco Inc., San Ramon, CA (US)

( * ) Notice: Subject to any disclaimer, the term of this patent is extended or adjusted under 35 U.S.C. 154(b) by 399 days.

(21) Appl. No.: 10/408,001

(22) Filed: Apr. 4, 2003

(65) Prior Publication Data

US 2004/0194383 A1 Oct. 7, 2004

(51) Int. Cl.
*C01B 3/36* (2006.01)

(52) U.S. Cl. .................................. 48/197 R; 48/127.9

(58) Field of Classification Search .............. 48/197 R, 48/127.9
See application file for complete search history.

(56) References Cited

U.S. PATENT DOCUMENTS

| | | | |
|---|---|---|---|
| 4,673,624 A | 6/1987 | Hockaday | |
| 5,731,101 A | 3/1998 | Sherif et al. | |
| 5,827,602 A | 10/1998 | Koch et al. | |
| 6,309,768 B1 * | 10/2001 | Patterson et al. | 429/13 |
| 6,645,650 B1 * | 11/2003 | Meyer et al. | 429/13 |
| 6,660,416 B1 * | 12/2003 | Sederquist et al. | 429/19 |
| 6,828,048 B1 * | 12/2004 | Margiott et al. | 429/17 |
| 6,887,436 B1 * | 5/2005 | Fisher et al. | 422/177 |
| 2002/0083646 A1 | 7/2002 | Deshpande et al. | |
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090328 A1 | 7/2002 | Deshpande | |
| 2002/0090334 A1 | 7/2002 | Stevens et al. | |

(Continued)

OTHER PUBLICATIONS

Suarez et al., "Synthesis and physical-chemical properties of ionic liquids based on 1-*n*-butyl-3-methylimidazolium cation," *J. Chim. Phys.* 95:1626-1639 (1998).

(Continued)

*Primary Examiner*—Glenn Caldarola
*Assistant Examiner*—Tom P. Duong
(74) *Attorney, Agent, or Firm*—Williams, Morgan & Amerson; Frank C. Turner; Melissa Patangia (57) ABSTRACT

A method for start-up and shut down of a fuel processor including an autothermal reformer employing a non-pyrophoric shift catalyst is disclosed. Also disclosed are a computer programmed to start-up or shut down a fuel processor including an autothermal reformer employing a non-pyrophoric shift catalyst or a program storage medium encoded with instruction that, when executed by a computer, start-up or shut down a fuel processor including an autothermal reformer employing a non-pyrophoric shift catalyst.

20 Claims, 7 Drawing Sheets

U.S. PATENT DOCUMENTS

| | | |
|---|---|---|
| 2002/0094310 A1 | 7/2002 | Krause et al. |
| 2002/0098129 A1 | 7/2002 | Martin et al. |
| 2002/0155329 A1 | 10/2002 | Stevens |

OTHER PUBLICATIONS

Wilkes et al., "Air and Water Stable 1-Ethyl-3-methylimidazolium Based Ionic Liquids," *J. Chem. Soc., Chem. Commun.* 965-967 (1992).

Fannin, Jr. et al., "Properties of 1,3-Dialkylimidazolium Chloride—Aluminum Chloride Ionic Liquids. 2. Phase Transitions, Densities, Electronic Conductivities, and Viscosities," *J. Phys. Chem.* 88:2614-2621 (1984).

Fuller et al., "Structure of 1-Ethyl-3-methylimidazolium Hexafluorophosphate: Model for Room Temperature Molten Salts," *J. Chem. Soc., Chem. Commun.* 299-300 (1994).

Bowlas et al., "Liquid-crystalline ionic liquids," *Chem. Commun.* 1625-1626 (1996).

Bonhôte et al., "Hydrophobic, Highly Conductive Ambient-Temperature Molten Salts," *Inorg. Chem.* 35:1168-1178 (1996).

\* cited by examiner

AUTOTHERMAL REFORMING IN A FUEL PROCESSOR UTILIZING NON-PYROPHORIC SHIFT CATALYST

BACKGROUND OF THE INVENTION

1. Field of the Invention

The present invention is directed to a fuel processor, and, more particularly, to a control system for a fuel processor.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

SUMMARY OF THE INVENTION

The invention comprises a method for start-up and shut down of a fuel processor including an autothermal reformer employing a non-pyrophoric shift catalyst.

In a first aspect, the invention includes a method for starting up an autothermal reformer in a fuel processor, comprising: purging the reactor of the autothermal reformer with a fuel above the upper explosive limit of a process feed stream comprising the fuel at an initial temperature; maintaining a non-pyrophoric shift catalyst of the autothermal reformer at a temperature sufficient to prevent condensation of water therein; heating the purged autothermal reformer reactor to the light off temperature of the non-pyrophoric shift catalyst while continuing to flow the fuel therethrough; introducing air to the heated autothermal reformer reactor to produce an air and fuel mixture exceeding the upper explosive limit of the fuel; and heating the autothermal reformer reactor to an operating temperature.

In a second aspect, the invention includes a method for lighting off an oxidizer in a fuel processor, comprising: purging a reactor of the oxidizer with air at an initial temperature; generating an ignition heat in at least a portion of the purged oxidizer reactor; introducing a fuel to the heated region of the oxidizer reactor, the resulting mixture of the fuel and the air remaining below the lower explosive limit of the fuel; and heating the oxidizer reactor containing the fuel/air mixture to an operating temperature.

In a third aspect, the invention includes a method for shutting down an autothermal reformer employing a non-pyrophoric shift catalyst in a fuel processor, comprising: terminating air flow to the autothermal reformer reactor; terminating water flow to the autothermal reformer reactor after terminating the air flow; purging the autothermal reformer reactor with a fuel; and allowing the autothermal reformer reactor to cool to a shutdown temperature.

In a fourth aspect, the invention includes a method for shutting down an oxidizer for use with an autothermal reformer employing a non-pyrophoric shift catalyst, comprising: terminating the flow of the fuel to a reactor of the oxidizer; purging the oxidizer reactor with air until the temperature within the oxidizer reactor reaches an ambient temperature; and terminating the air flow to the purged oxidizer reactor.

In still other aspects, the invention includes a computer programmed to start-up or shut down a fuel processor including an autothermal reformer employing a non-pyrophoric shift catalyst or a program storage medium encoded with instruction that, when executed by a computer, start-up or shut down a fuel processor including an autothermal reformer employing a non-pyrophoric shift catalyst.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is generally directed to method and apparatus for controlling a "fuel processor," or "reformer," i.e., an apparatus for converting hydrocarbon fuel into a hydrogen rich gas. The term "fuel processor" shall be used herein. In the embodiment illustrated herein, the method and apparatus control a compact processor for producing a hydrogen rich gas stream from a hydrocarbon fuel for use in fuel cells. However, other fuel processors may be used in alternative embodiments. Furthermore, other possible uses are contemplated for the apparatus and method described herein, including any use wherein a hydrogen rich stream is desired. The method and apparatus may also be used in embodiments not applicable to the production of gas streams. Accordingly, while the invention is described herein as being used in conjunction with a fuel cell, the scope of the invention is not limited to such use.

Figure 1:
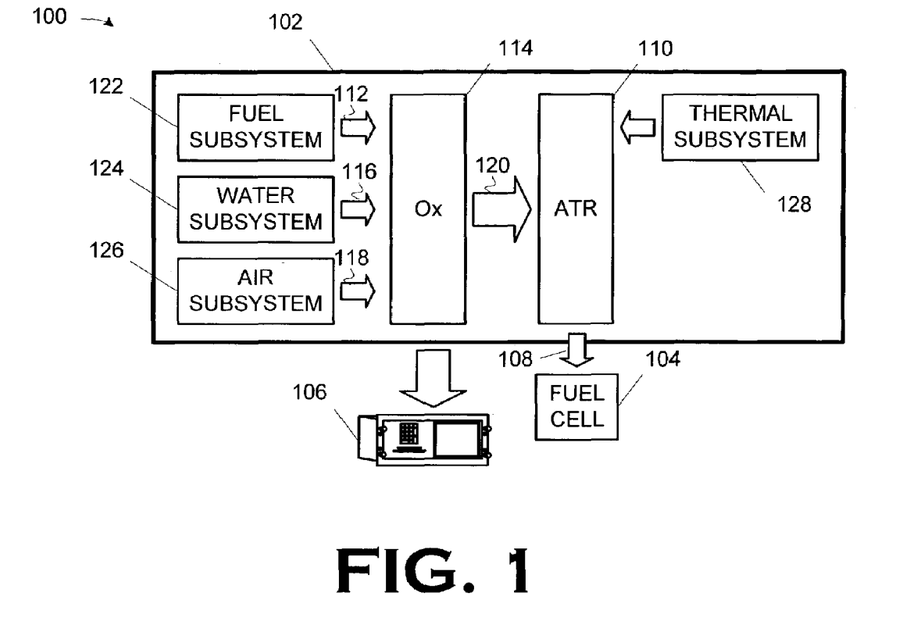
FIG. 1 illustrates one particular embodiment of a fuel processor power plant assembled and operated in accordance with the present invention.

FIG. 1 conceptually illustrates a fuel cell power plant 100 including a fuel processor 102, a fuel cell 104, and an automated control system 106. The fuel processor 102 is, in the illustrated embodiment, a self-contained auto-thermal reforming ("ATR") fuel processor that converts pipeline-quality natural gas to fuel cell grade fuel. Thus, the power plant 100 is a natural gas power plant, although the invention may be practiced with alternative fuels and end applications. In the illustrated embodiment, the fuel cell 104 is a conventional Proton Exchange Membrane Fuel Cell ("PEMFC"), also known as a Polymer Electrolyte Fuel Cell ("PEFC"). However, other types of fuel cells may be used. Note also that the fuel processor 102 is not limited to use with fuel cells, e.g., the fuel cell 104. Product gas of the reformate 108 may be used as the feed for a fuel cell, as shown, or for other applications where a hydrogen rich feed stream is desired. Optionally, product gas may be sent on to further processing, for example, to remove the carbon dioxide, water or other components. Thus, the invention is not limited to use in fuel cell power plants or even in power plants.

As previously mentioned, the fuel in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C--H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The operation of the fuel processor 102 and the fuel cell 104 are inter-related in the illustrated embodiment. The fuel processor 102 provides a hydrogen-rich effluent stream, or "reformate," as indicated by the graphic 108, to the fuel cell 104. The reformate 108, in the illustrated embodiment, includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream). Note, however, that the precise composition of the reformate 108 is implementation specific and not material to the practice of the invention.

Still referring to FIG. 1, the fuel processor 102 of the illustrated embodiment comprises several modular physical subsystems, namely:

an autothermal reformer ("ATR") 110 that performs the oxidation-reduction reaction that reforms a fuel 112 input to the fuel processor 102 into a reformate 105 for a fuel cell 104;

an oxidizer ("Ox") 114, which is an anode tailgas oxidizer ("ATO") in the illustrated embodiment, that mixes water 116, fuel 112, and air 118 to create a fuel mixture, or "process feed stream", 120 delivered to the ATR 110;

a fuel subsystem 122, that delivers an input fuel 112 (natural gas, in the illustrated embodiment) to the oxidizer 114 for mixing into the process feed stream 120 delivered to the ATR 110;

a water subsystem 124, that delivers the water 116 to the oxidizer 114 for mixing into the process feed stream 120 delivered to the ATR 110;

an air subsystem 126, that delivers air 118 to the oxidizer 114 for mixing into the process feed stream 120 delivered to the ATR 110; and a thermal subsystem 128, that controls temperatures in the operation of the ATR 110 by circulating a coolant 113 therethrough.

Particular embodiments of the oxidizer 114 and the ATR 110 are disclosed more fully below. The fuel subsystem 122, water subsystem 124, air subsystem 125, and thermal subsystem 128 may be implemented in any manner known to the art suitable for achieving the operational characteristics of the oxidizer 114 and ATR 110.

Figure 2A:
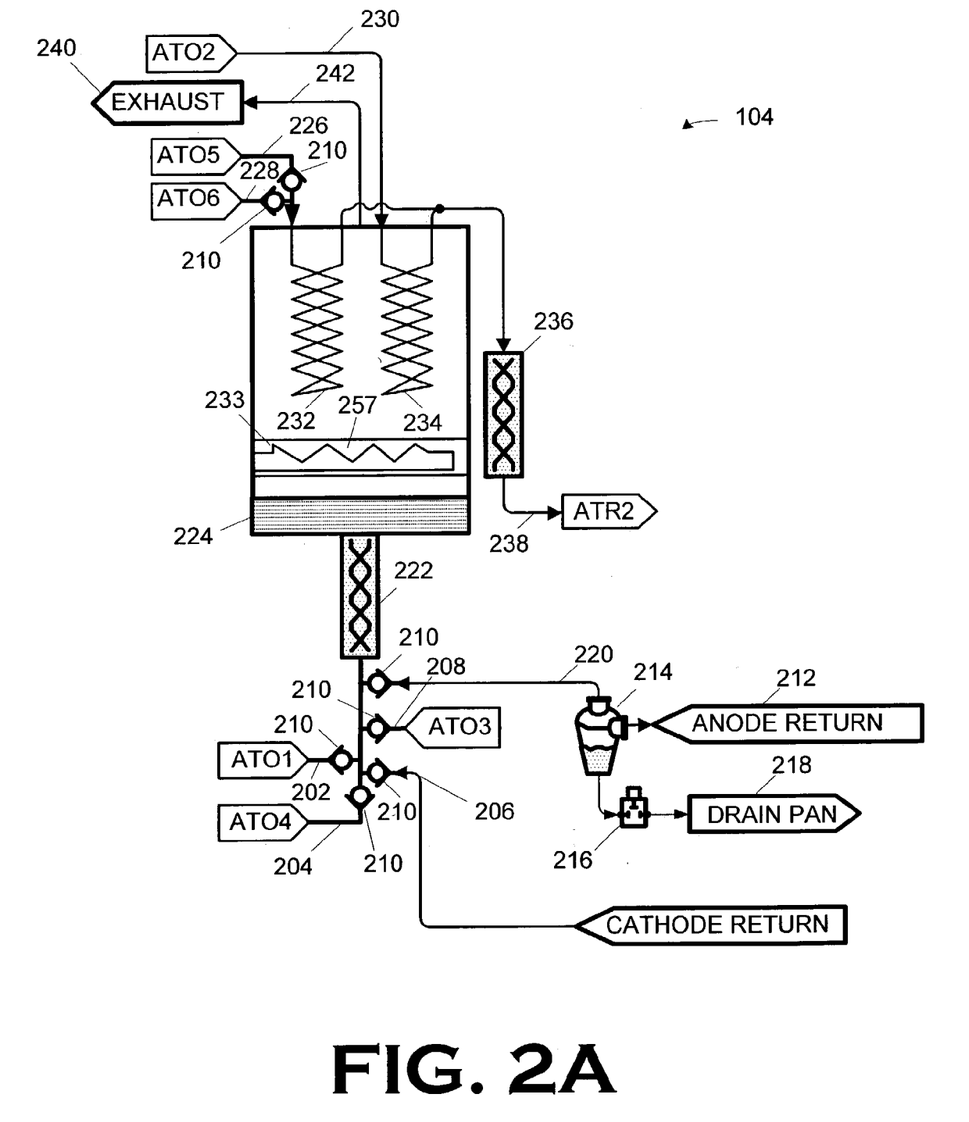
FIG. 2 details the anode tailgas oxidizer of the fuel processor in FIG. 1 and its operation.

FIG. 2A depicts one particular implementation of the oxidizer 114. The oxidizer 114 receives fuel, water, and air through the feeds ATO1, ATO2, ATO3, ATO4 via the lines 202, 204, 206, 208, described above, from the fuel subsystem 122, water subsystem 124, the air subsystem 126, and the ATR 110 through a plurality of check valves 210. The feed ATO3 is from a water separation system (discussed below) associated with the ATR 110. Exhaust 212 from the anode (not shown) of the fuel cell 103 is returned to a water separator 214, that separates out the water that is drained via the solenoid valve 216 to the drain pan 218. The dehydrated anode return is then supplied to the oxidizer 114 via a check valve 210 through the line 220. The fuel, air, and dehydrated anode return are then mixed in the mixer 222, before introduction to the reactor 224 of the oxidizer 114. The resultant mixture is then heated by the electric heater 233.

Still referring to FIG. 2A, the oxidizer 114 also receives fuel, air, and water from the fuel subsystem 122, the water subsystem 124, and the air subsystem 126 through the feeds ATO5, ATO6, ATO2 over the lines 226, 228, and 230, respectively, described above. The lines 226 and 228 are protected by check valves 210. Air and fuel received over the lines 226, and 228 enter the enclosed coil 232. Water received over the line 230 enters the enclosed coil 234. The heated air, water, and fuel mixture in the reactor 224 heats the contents of the enclosed coils 232, 234, which are then mixed in the mixer 236 and provided to the ATR 110 through the feed ATR2 over the line 238. The oxidizer 114 is vented to an exhaust 240 through a line 242.

Figure 2B:
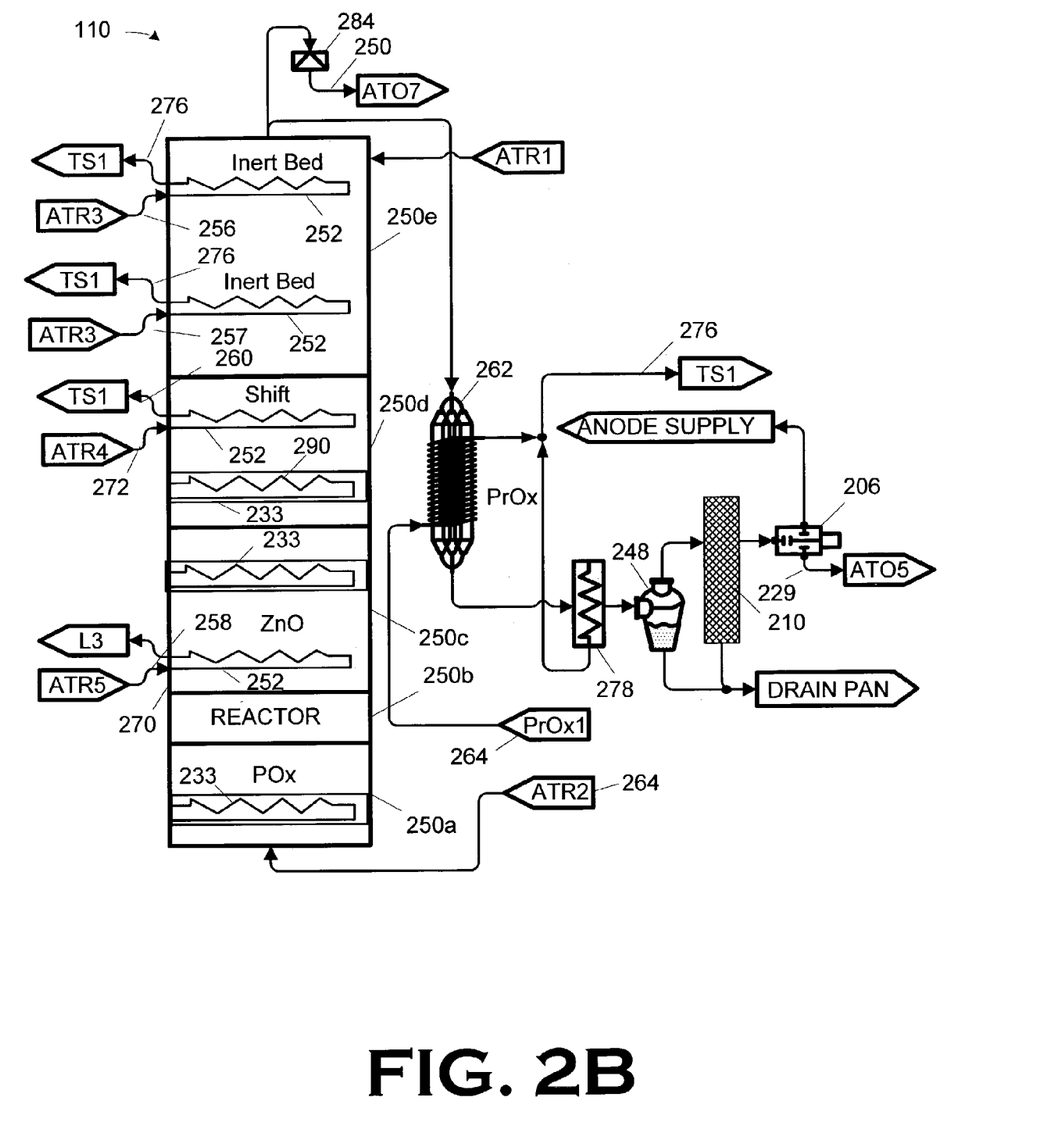

FIG. 2B depicts one particular implementation of the ATR 110. The ATR 110 comprises several stages 250a–250e, including numerous heat exchangers 252 and electric heaters 233. Each of the heat exchangers 252 receives temperature controlled coolant (not shown) from the thermal subsystem 128 over the lines 256–258 and returns it over the lines 260. The exceptions are the heat exchangers 252 in the preferential oxidizing ("prox") stage 262, which receives the coolant (not shown) from the thermal subsystem 128 over the line 264 and returns it to the thermal subsystem 128 via line 260 and the feed TS1. The reformate gas exiting the ATR 110 passes through a preferential oxidizer 262, is heated by the heat exchanger 252, dehydrated by the water separator 214, filtered, and supplied to the anode (not shown) of the fuel cell 103 (shown in FIG. 1).

Note that the shift 250d employs a non-pyrophoric shift catalyst, not shown. Non-pyrophoric shift catalysts are those that typically do not increase in temperature more than 200° C. when exposed to air after initial reduction. Non-pyrophoric shift catalysts may be based on :precious metals, e.g., platinum or non-precious metals, e.g., copper. One commercially available non-pyrophoric shift catalyst suitable for use with the present invention is the SELECTRA SHIFT™ available from:

Engelhard Corporation

101 Wood Avenue

Iselin, N.J. 08830

(732) 205–5000

However, other suitable non-pyrophoric shift catalysts may be used.

Returning to FIG. 1, the automated control system 106 controls the operation of the fuel processor 102, as indicated by the graphic 110. In some embodiments, the automated control system 106 may control the operation of the fuel cell 104 in addition to the fuel processor 102. The automated control system 106 is largely implemented in software on a computing apparatus, such as the rack-mounted computing apparatus 300 illustrated in FIG. 3A and FIG. 3B. Note that the computing apparatus 300 need not be rack-mounted in all embodiments. Indeed, this aspect of any given implementation is not material to the practice of the invention. The computing apparatus 300 may be implemented as a desktop personal computer, a workstation, a notebook or laptop computer, an embedded processor, or the like.

Figure 3A:
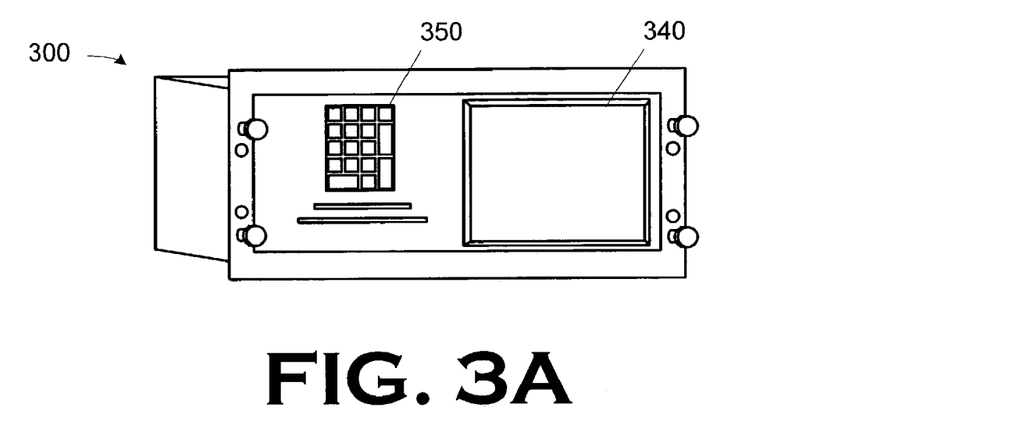
FIG. 3A and FIG. 3B conceptually illustrate a computing apparatus as may be used in the implementation of one particular embodiment of the present invention.
Figure 3B:
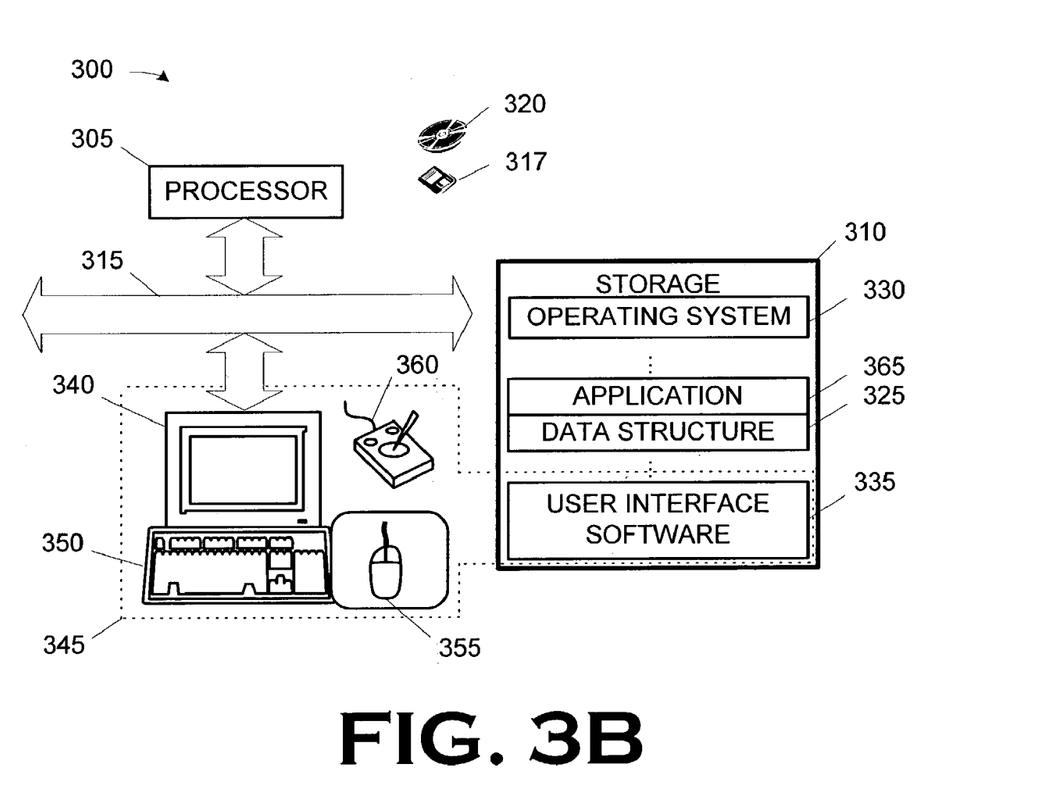

The computing apparatus 300 illustrated in FIG. 3A and FIG. 3B includes a processor 305 communicating with storage 310 over a bus system 315. The storage 310 may include a hard disk and/or random access memory ("RAM") and/or removable storage such as a floppy magnetic disk 317 and an optical disk 320. The storage 310 is encoded with a 15 data structure 325 storing the data set acquired as discussed above, an operating system 330, user interface software 335, and an application 365. The user interface software 335, in conjunction with a display 340, implements a user interface 345. The user interface 345 may include peripheral I/O devices such as a key pad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330. In the illustrated embodiment, the application 365 includes the control system 100 illustrated in FIG. 1.

Thus, at least some aspects of the present invention will typically be implemented as software on an appropriately programmed computing device, e.g., the computing apparatus 300 in FIG. 3A and FIG. 3B. The instructions may be encoded on, for example, the storage 310, the floppy disk 317, and/or the optical disk 320. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein may consequently be presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 4A:
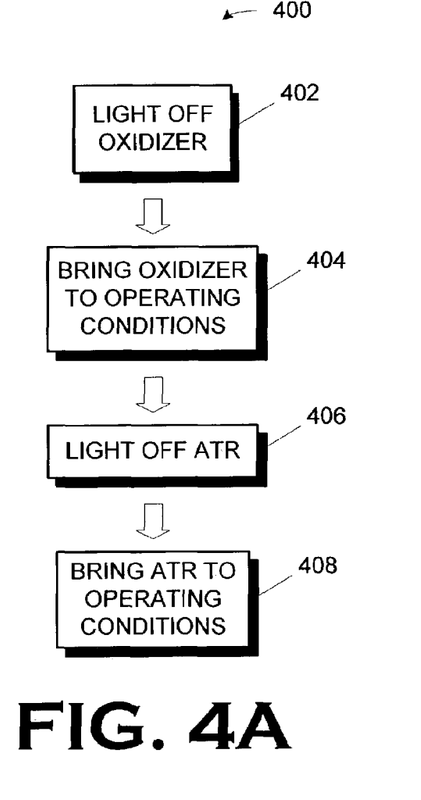
FIG. 4A–FIG. 4C conceptually illustrate the start-up of the fuel processor first shown in FIG. 1.
Figure 4B:
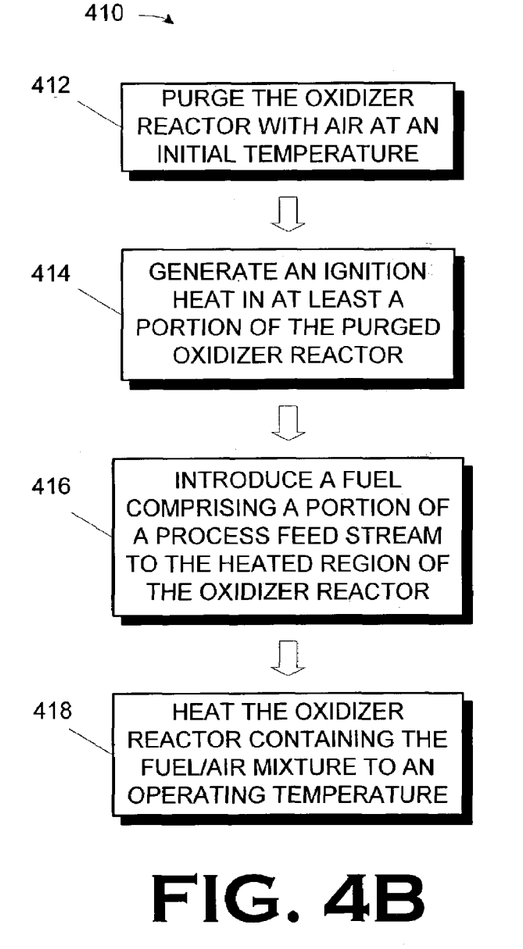
Figure 4C:
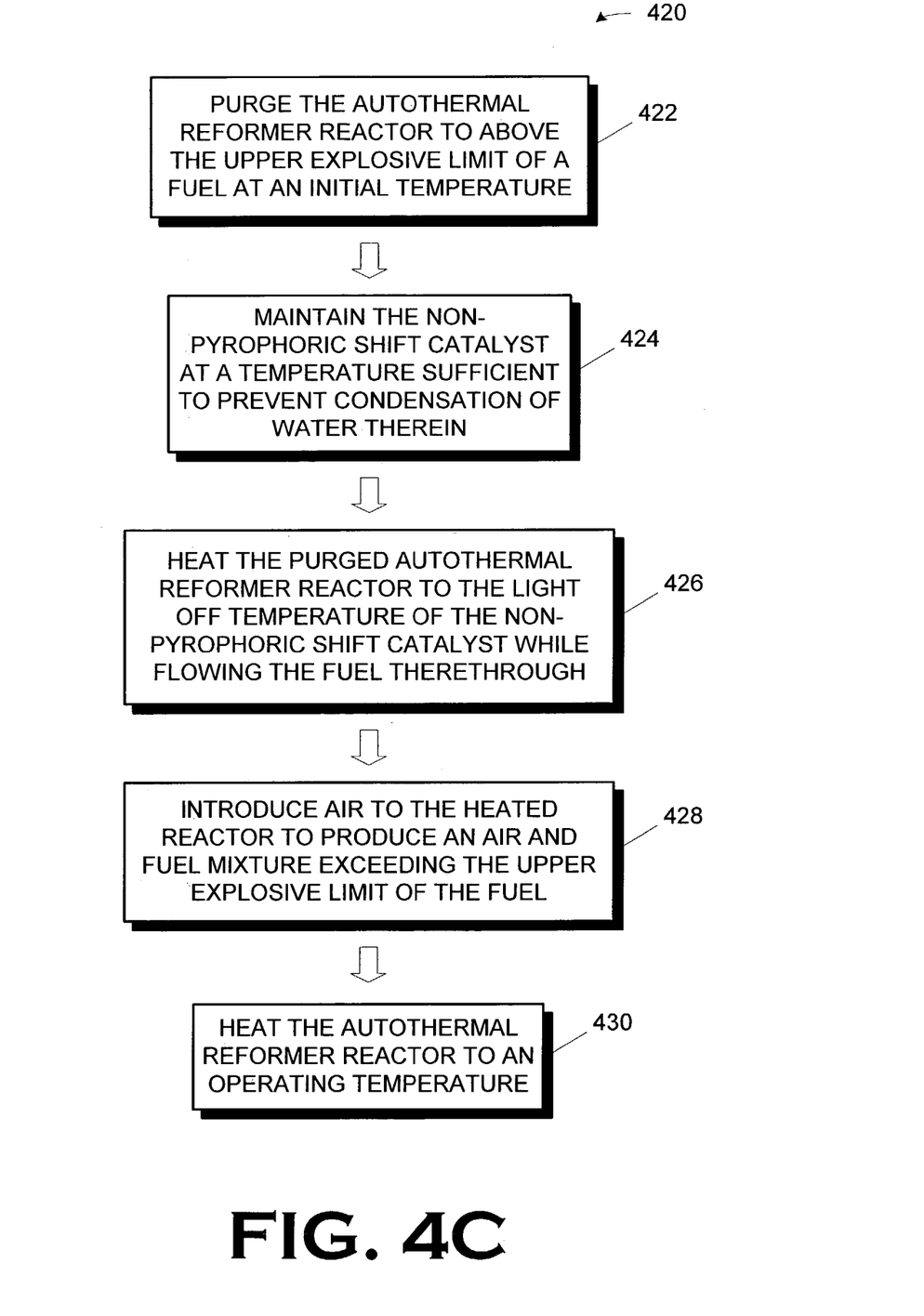

Turning now to FIG. 4A, in general terms, the fuel processor 102 start-up (at 400) involves lighting off oxidizer 114 (at 402), bringing the oxidizer 114 to operating conditions (at 404), lighting off the ATR 110 (at 406), and then bringing the ATR 110 to operating conditions (at 408). The oxidizer 114 light off is the state of the oxidizer 114 when there is an ongoing catalysed reaction between the fuel and air in a desired temperature range. Similarly, the ATR 110 light off is the state of the ATR 110 when it is considered to have an ongoing catalysed reaction between the components of the process feed stream 120 received from the oxidizer 114. FIG. 4B illustrates (at 410) the oxidizer 114 light off more particularly. FIG. 4C illustrates (at 420) the ATR 110 light off more particularly.

Referring now to FIG. 4B, the oxidizer 114 light off begins by purging (at 412) the reactor 224 (shown in FIG. 2A) of the oxidizer 114 with air at an initial temperature. The fuel processor 102, prior to start-up, will be at some ambient temperature, i.e., its temperature will not be actively controlled. This ambient temperature will typically be a "room" temperature, or less than approximately 50° C., but this is not necessary to the practice of the invention. Thus, the "initial" temperature of the purge will usually be the ambient temperature of the fuel processor 102's environment, which will typically by a "room" temperature of less than approximately 50° C.

In the illustrated embodiment, the reactor 224 is purged (at 412) with air 118 supplied from the air subsystem 126 at a rate of 200 L/min for a minimum of 15 minutes, or at least three reactor volumes of air 118. As those in the art having the benefit of this disclosure will appreciate, this rate and duration are a function of the volume of the reactor 224. Accordingly, the rate and duration are implementation specific, and other rates and durations may be applied in alternative embodiments. The content of the reactor 224 at this point is 100% air for the illustrated embodiment. However, this is not necessary to the practice of the invention. The objective is to purge the reactor 224 to just below the lower explosive limit ("LEL") of the fuel 112 that is to be subsequently introduced. Other air flow rates, durations, and volumes therefore may be used in alternative embodiments.

The oxidizer light off proceeds by generating (at 414) an ignition heat in at least a portion of the purged oxidizer reactor 224. The manner in which the ignition heat is generated will be implementation specific, e.g., by heating at least a portion of a catalyst bed to at least a light off temperature or actuating a spark source. In the illustrated embodiment, the ignition heat is generated in the catalyst bed 257 (shown in FIG. 2A) by heating it to at least approximately 280° C. with the heat exchanger 256. Note that only a portion of the catalyst bed 257 needs to be heated in this manner.

Still referring to FIG. 4B, the oxidizer light off next introduces (at 416) a fuel to the heated region of the oxidizer reactor 224. The resulting mixture of the fuel and the air remains below the lower explosive limit of the fuel. As those in the art having the benefit of this disclosure will appreciate, the lower explosive limit will vary depending on the fuel, and the amount of fuel introduced (at 416) will consequently depend on the fuel. In the illustrated embodiment, the fuel introduced is the fuel that will eventually be reformed, i.e., the fuel. As previously mentioned, the fuel 112 is, in the illustrated embodiment, natural gas, although other hydrocarbons may be used. The illustrated embodiment therefore introduces natural gas to achieve an air and natural gas mixture comprising less than 3.4% natural gas, or an O/C (NG) ratio of greater than 6.0. This is below the LEL of 4.0% natural gas in air, or 5.05 O/C(NG).

The oxidizer light off proceeds by heating (at 418) the oxidizer reactor containing the fuel/air mixture to an operating temperature. An "operating temperature" is a temperature high enough to start and sustain a catalyst reaction of the fuel/air mixture with, e.g., the catalyst bed 257 (shown in FIG. 2). In the illustrated embodiment, oxidizer reactor 224 is heated to a temperature between approximately 400° C. and approximately 800° C. At this point, the oxidizer 114 is lighted off.

Turning now to FIG. 4C, the ATR 110 light off begins by purging (at 424) the reactor 250b (shown in FIG. 2B) of the ATR 110 with a fuel at an initial temperature to at least the upper explosive limit ("UEL") of the fuel. As with the purge (at 412, in FIG. 4B) of the oxidizer 114, the "initial" temperature of the purge will usually be the ambient temperature of the fuel processor 102's environment, which will typically by a "room" temperature of less than approximately 50° C. The purge fuel in the illustrated embodiment is the fuel 112 delivered from the fuel subsystem 122. As previously noted, the fuel 112 in the present invention is natural gas, although other hydrocarbons may be used. The UEL of the fuel 112 will vary depending on the implementation of the fuel 112. In the illustrated embodiment, this is done by introducing at least four reactor volumes of the fuel 112 through the reactor 250b. However, this is not necessary to the practice of the invention so long as the reactor 250b is purged to at least above the UEL of the fuel 112.

The light off of the ATR 110 continues by (at 424), maintaining the non-pyrophoric shift catalyst (not shown) of the autothermal reformer 110 shift 250d at a temperature sufficient to prevent condensation of water therein. In the illustrated embodiment, the ATR 110 employs heaters (i.e., the heat exchanger 290, in FIG. 2B) and cooling coils (i.e., the cooling coil 292, in FIG. 2B) to maintain the temperature of the non-pyrophoric shift catalyst between approximately 150° C. and 200° C. The upper bound is placed on the temperature of the non-pyrophoric shift catalyst to prevent damage thereto. Note that, as was stated earlier, the start-up begins with the ATR 110, including the shift 250d, at an ambient temperature. It will therefore be likely that the non-pyrophoric shift catalyst will first need to be heated. This heating may be performed before, during, or after the purge of the reactor 250b, depending on the particular embodiment.

Still referring to FIG. 4C, the ATR 110 light off continues by (at 426) heating the purged reactor 250b to the light off temperature of the non-pyrophoric shift catalyst while continuing to flow the fuel 112 therethrough. As those in the art having the benefit of the present disclosure will appreciate, the light off temperature will vary depending on the implementation of the non-pyrophoric shift catalyst. The illustrated embodiment employs the SELECTRA SHIFT™ as discussed above and heats the reactor 250b to approximately 300° C.

The ATR 110 light off then introducing air 118 (at 428) to the reactor 250b to produce an air and fuel mixture (not shown) exceeding the upper explosive limit ("UEL") of the fuel 112. The illustrated embodiment implements the fuel 112 with natural gas, which has a UEL of 17.0% in air, or 1.03 O/C(NG). Thus, the illustrated embodiment introduces air to achieve a concentration of 26% natural gas in air, or an O/C(NG) ratio of 0.6.

The ATR 110 light off concludes by heating (at 430) the reactor 250b to an operating temperature. In the illustrated embodiment, the operating temperature will be between approximately 600° C. and approximately 900° C., and preferably approximately 700° C. The non-pyrophoric shift catalyst will be maintained at a temperature of approximately 250° C. More detail on the normal operation of the ATR 110 after start-up is provided immediately below.

Figure 5:
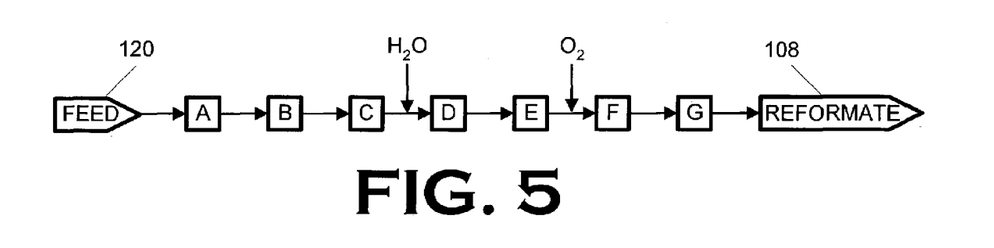
FIG. 5 graphically illustrates the reforming process of the autothermal reformer of the fuel processor first shown in FIG. 1 during the run state in the illustrated embodiment.

In normal operation, the processor reactor (not shown) of the ATR 104 reforms the process feed stream 120 into the hydrogen, or hydrogen-enriched, gas stream and effluent byproducts, such as water. The process feed stream 120 in the illustrated embodiment conveys a fuel, air, and water mixture from the oxidizer 114, shown in FIG. 1. FIG. 5 depicts a general process flow diagram illustrating the process steps included in the illustrative embodiments of the present invention. The following description associated with FIG. 5 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1).

The fuel processor 102 process feed stream 120 includes a hydrocarbon fuel, oxygen, and water mixture, as was described above. The oxygen can be in the form of air, enriched air, or substantially pure oxygen. The water can be introduced as a liquid or vapor. The composition percentages of the feed components are determined by the desired operating conditions, as discussed below. The fuel processor effluent stream from of the present invention includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream).

Process step A is an autothermal reforming process in which, in one particular embodiment, two reactions, a partial oxidation (formula I, below) and an optional steam reforming (formula II, below), are performed to convert the feed stream 120 into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \tag{I}$$

The process feed stream 120 is received by the processor reactor from the oxidizer 114, shown in FIG. 1. A higher concentration of oxygen in the process feed stream 120 favors partial oxidation whereas a higher concentration of water vapor favors steam reforming. The ratios of oxygen to hydrocarbon and water to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in the reformer with or without a steam reforming catalyst.

Process step B is a cooling step for cooling the synthesis gas stream from process step A to a temperature of from about 200° C. to about 600° C., preferably from about 375° C. to about 425° C., to prepare the temperature of the synthesis gas effluent for the process step C (discussed below). This cooling may be achieved with heat sinks, heat pipes or heat exchangers depending upon the design specifications and the need to recover/recycle the heat content of the gas stream using any suitable type of coolant. For instance, the coolant for process step B may be the coolant 113 of the thermal subsystem 128.

Process step C is a purifying step and employs zinc oxide (ZnO) as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfurization is accomplished by converting the hydrogen sulfide to is water in accordance with the following reaction formula III:

$$H_2S + ZnO \rightarrow H_2O + ZnS \tag{III}$$

The reaction is preferably carried out at a temperature of from about 300° C. to about 500° C., and more preferably from about 375° C. to about 425° C.

Still referring to FIG. 5, the effluent stream may then be sent to a mixing step D in which water 116 received from the water subsystem 124, both shown in FIG. 1, is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G (discussed below). This temperature is also controlled by the control system of the present invention.

Process step E is a water gas shift reaction that converts carbon monoxide to carbon dioxide in accordance with formula IV:

$$H_2O + CO \rightarrow H_2 + CO_2 \tag{IV}$$

The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step. This temperature and concentration are more parameters controlled by the control system of the present invention.

Returning again to FIG. 5, process step F is a cooling step. Process step F reduces the temperature of the gas stream to produce an effluent having a temperature preferably in the range of from about 90° C. to about 150° C. Oxygen from an air subsystem (not shown) is also added to the process in step F. The oxygen is consumed by the reactions of process step G described below.

Process step G is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \tag{V}$$

$$H_2 + \tfrac{1}{2}O_2 \rightarrow H_2O \tag{VI}$$

The preferential oxidation of carbon monoxide is favored by low temperatures. Since both reactions produce heat it may be advantageous to optionally include a cooling element such as a cooling coil, disposed within the process. The operating temperature of process is preferably kept in the range of from about 90° C. to about 150° C. Process step G reduces the carbon monoxide level to preferably less than 50 ppm, which is a suitable level for use in fuel cells.

The reformate 105 exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components. Table 1 presents additional information on the normal operation of the ATR 110.

TABLE 1

Non-Pyrophoric Shift Catalyst Areas of Operation

| Reducing (Reformate) | Oxidizing (Air) |
| --- | --- |
| Maximum Temperature when operating < 300° C. | No steam during oxidizing |
| Up to 350° C. for transients < 30 minutes | H2O is reversible; |
| If over temperature, non-reversible, methenation begins | 220° C. overnight; 400° C. in 1 hour |
| No liquid water | No liquid water. |

Figure 6A:
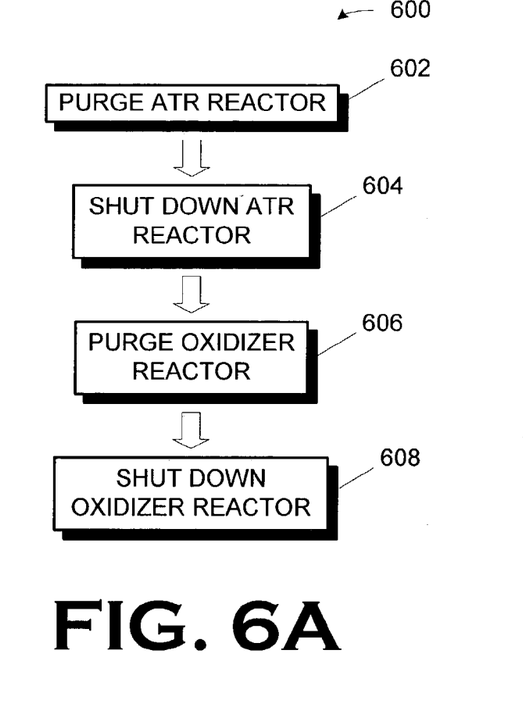
FIG. 6A–FIG. 6C conceptually illustrate the shut down of the fuel processor first shown in FIG. 1.

Eventually, the operational cycle ends, and the fuel processor 102 is shutdown, as 15 shown in FIG. 6A (at 600). The shutdown may be planned, as in the case for maintenance, or unplanned, as when a shutdown error condition occurs. The oxidizer 110 and ATR 110 reactors 256 and 250b, respectively, are, in general terms, purged and cooled. On transition to the shutdown state, the air subsystem 126, the water subsystem 124, and the thermal subsystem 128 are providing air 118, water 116, and thermal control to the oxidizer 110 and the ATR 110. In the illustrated embodiment, the ATR 110 is first purged (at 602) and shutdown (at 604), followed by the oxidizer 110 purge (at 606) and shutdown (at 608).

Figure 6B:
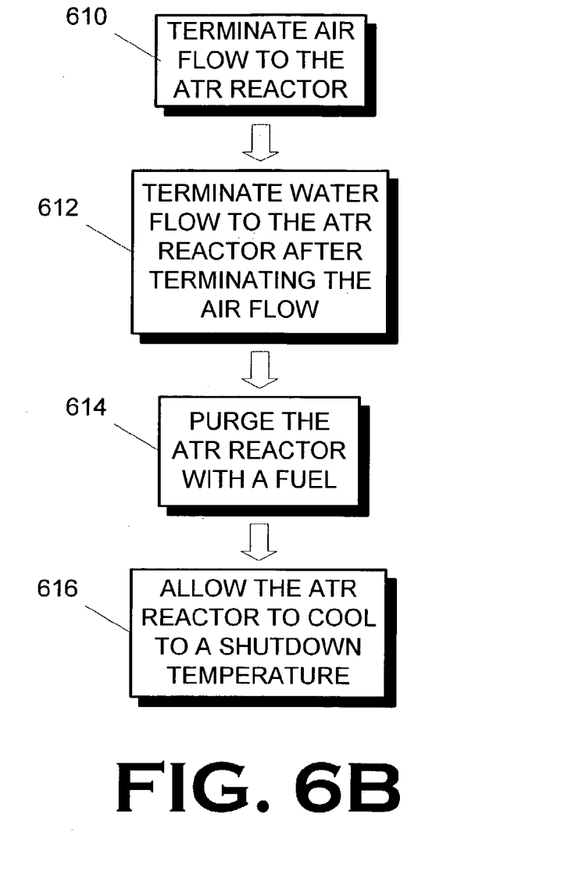

Turning now to FIG. 6B, to shutdown and purge the ATR 110, the air subsystem 126 terminates the flow of air 118 (at 610), followed by the water subsystem 124 terminating (at 612) the flow of water 116 to the reactor 250b of the ATR 110. The fuel subsystem 122 then continues (not shown) the flow of fuel 112 as the reactor 250b of the ATR 110 purges (at 614) with the fuel 112. The components are allowed to cool to a shutdown temperature (at 616). The shutdown temperature may be an ambient temperature. In the illustrated embodiment, however, the thermal subsystem 128 continues to cool (not shown) various components of the ATR 110, including the reactor 250b until they cool to below approximately 50° C., whereupon the cooling coils are turned off.

Figure 6C:
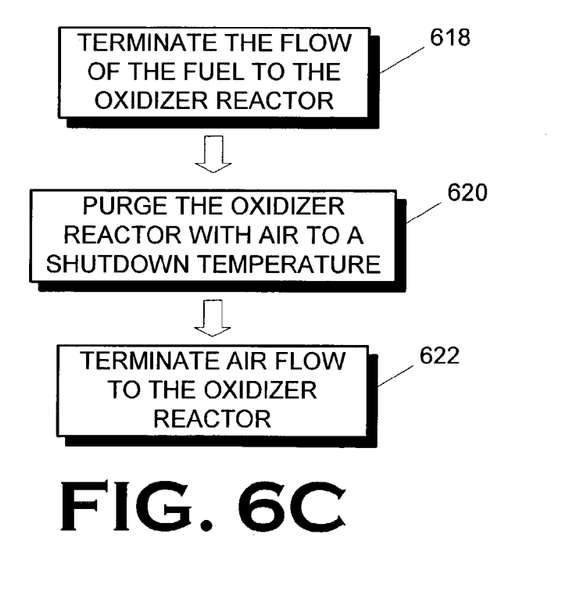

To shutdown and purge the oxidizer 110, as is shown in FIG. 6C, the fuel subsystem 122 terminates (at 618) the flow of fuel 112 to the reactor 224 of the oxidizer 110, whereupon the oxidizer reactor 224 is purged (at 620) with air 118 from the air subsystem 126. The oxidizer reactor 224 is purged until it reaches a predetermined, shutdown temperature, as opposed to the ATR reactor 250b, which is purged by volume. This approach is taken in the oxidizer reactor 224 purging because differences in catalyst loading in different parts of the bed may be more active than the other. In the illustrated embodiment, the oxidizer reactor 224 is purged to an ambient, or "room," temperature, or a temperature below approximately 50° C. Once the oxidizer reactor 224 is purged, the air subsystem 126 terminates (at 622) the air supply to the oxidizer 110 and shuts down the components (e.g., the compressor) of the air subsystem 126. The water subsystem 124, fuel subsystem 122, and thermal subsystem 128 also shut down the components of the water subsystem 124, fuel subsystem 122, and thermal subsystem 128.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for starting up an autothermal reformer in a fuel processor, comprising:
   purging the reactor of the autothermal reformer with a fuel above the upper explosive limit of a process feed stream comprising the fuel at an initial temperature;
   maintaining a non-pyrophoric shift catalyst of the autothermal reformer at a temperature sufficient to prevent condensation of water therein;
   heating the purged autothermal reformer reactor to the light off temperature of the non-pyrophoric shift catalyst while continuing to flow the fuel therethrough;
   introducing air to the heated autothermal reformer reactor to produce an air and fuel mixture exceeding the upper explosive limit of the fuel; and
   heating the autothermal reformer reactor to an operating temperature.

2. The method of claim 1, further comprising lighting off an oxidizer to produce the process feed stream comprising the fuel for reforming by the autothermal reformer.

3. The method of claim 2, wherein lighting off the oxidizer includes:
   purging a reactor of the oxidizer with air at an initial temperature;
   generating an ignition heat in at least a portion of the purged oxidizer reactor;
   introducing a fuel comprising a portion of the process feed stream the mixture to the heated region of the oxidizer reactor, the resulting mixture of the fuel and the air remaining below the lower explosive limit of the fuel; and
   heating the oxidizer reactor to an operating temperature.

4. The method of claim 3, wherein purging the oxidizer reactor at the initial temperature includes purging the oxidizer reactor below approximately 50° C.

5. The method of claim 3, wherein purging the oxidizer reactor at the initial temperature includes purging the oxidizer reactor at ambient temperature.

6. The method of claim 3, wherein purging the oxidizer reactor includes purging the oxidizer reactor through at least thee reactor volumes of air.

7. The method of claim 3, wherein generating an ignition heat includes heating at least a portion of a catalyst bed to at least a light off temperature.

8. The method of claim 3, wherein generating an ignition heat includes actuating a spark source.

9. The method of claim 3, wherein generating the ignition heat includes generating an ignition heat of at least approximately 280° C.

10. The method of claim 3, wherein introducing the fuel includes introducing natural gas.

11. The method of claim 10, wherein introducing the natural gas includes introducing the natural gas to achieve an air and natural gas mixture having an O/C(NG) ratio of up to 6.0.

12. The method of claim 3, wherein heating the oxidizer reactor to an operating temperature includes heating the oxidizer reactor to a temperature between approximately 400° C. and approximately 800° C.

13. The method of claim 1, wherein purging the autothermal reformer reactor includes introducing at least four reactor volumes of fuel through autothermal reformer reactor.

14. The method of claim 1, wherein purging the autothermal reformer reactor at an initial temperature includes purging the autothermal reformer reactor below approximately 50° C.

15. The method of claim 1, wherein purging the autothermal reformer reactor at the initial temperature includes purging the autothermal reformer reactor at an ambient temperature.

16. The method of claim 1, wherein purging the autothermal reformer reactor with the fuel includes purging the autothermal reformer with natural gas.

17. The method of claim 1, wherein heating the purged autothermal reformer reactor to the light off temperature includes heating the purged autothermal reformer reactor to approximately 300° C.

18. The method of claim 1, wherein introducing air to the heated autothermal reformer reactor includes introducing air to achieve an O/C(NG) ratio of between approximately 0.4 and approximately 0.65, inclusive.

19. The method of claim 1, wherein introducing air to the heated autothermal reformer reactor includes introducing air to achieve a concentration of 26% natural gas in air.

20. The method of claim 1, wherein heating the autothermal reformer reactor to the operating temperature includes heating the autothermal reformer to a temperature between approximately 600° C. and approximately 900° C.

* * * * *